(No Model.)
M. E. SPOFFORD.
FAUCET.
No. 519,049. Patented May 1, 1894.
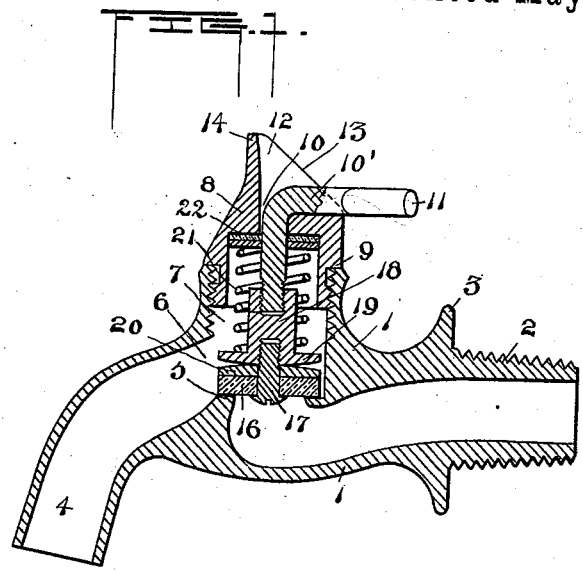
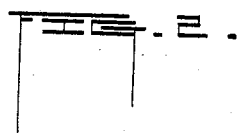
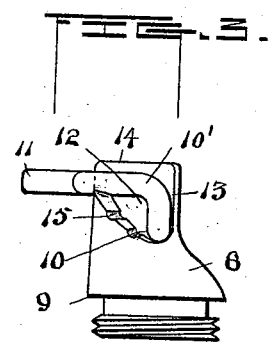
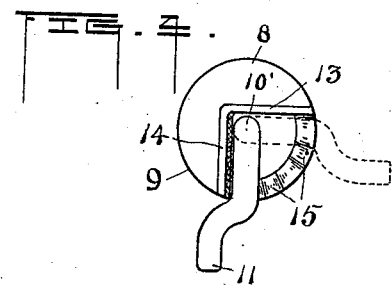
Witnesses
Arch. M. Catlin.
Harry Long.
Inventor
Marcellus E. Spofford
by
Benj. R. Catlin
Attorney

UNITED STATES PATENT OFFICE.

MARCELLUS E. SPOFFORD, OF KEENE, NEW HAMPSHIRE.

FAUCET.

SPECIFICATION forming part of Letters Patent No. 519,049, dated May 1, 1894.

Application filed April 3, 1893. Serial No. 468,926. (No model.)

*To all whom it may concern:*

Be it known that I, MARCELLUS E. SPOFFORD, a resident of Keene, in the county of Cheshire and State of New Hampshire, have invented certain new and useful Improvements in Faucets; and I do hereby declare the following to be a full, clear, and exact description of the invention, such as will enable others skilled in the art to which it pertains to make and use the same.

The invention relates to faucets and has for its object to provide a faucet that can be quickly and easily manipulated to permit the drawing off of liquids from their receptacles in regulated quantities without liability to drip and having a simple and economical construction; and it consists in the matters hereinafter described and particularly pointed out.

In the accompanying drawings Figure 1 is a central section; and Figs. 2 and 3 are elevations. Fig. 4 is a plan of the perforated plug detached from the faucet.

Numeral 1 denotes the main body of the faucet having the usual screw threaded end 2, collar 3 and delivery nozzle 4. A valve seat is indicated by 5, and 6 denotes an outlet situated above the seat and communicating with the nozzle.

7 denotes a valve chamber situated above the valve seat and outlet.

8 denotes a hollow screw plug of special form and perforated in its upper part but at its lower part made cylindrical and threaded to fit the chambered socket 7. It is provided with a shoulder 9 adapted to be closed tightly upon the end of the tubular socket 7, to prevent leakage.

The perforation 10 is intended to receive a valve stem handle 11 which is bent laterally and has its bent portion 10' in a recess 12 formed in the outer end of the plug. The walls 13 and 14 of this recess are at approximately right angles to each other and extend in right lines above the situation of the bent portion 10' of the valve stem or handle in manner to limit the movement in either direction. It is however free to move up and down the incline 15 and may be rested in either of the notches in the upper edge of said incline.

A valve is denoted by 16. This is secured by a screw 17 which enters a suitable socket in the stem 18. This stem has at its opposite end a screw threaded socket to receive the suitably threaded end of the handle 11.

19 is a flange on the stem 18 and 20 a washer interposed between said flange and the valve. These are made slightly convex on their contiguous surfaces to insure their bearing closely against each other near their centers. A coiled spring 21 surrounds the stem 18 and bears against the packing surrounding handle 11 pushing it against shoulder 22. A metallic washer may be interposed between the packing and spring if desired. The spring at its other end bears against the flange 19. Normally it holds the valve closed. When the handle is in the position indicated in Fig. 1 to open the valve the handle is turned so that its bend 10' is moved up the inclined wall 15 of the recess 12 with the effect to compress the spring and lift the valve from its seat. The height to which the valve is raised is determined by the situation of the handle and this may be practically fixed by suitably moving the handle and resting it in either of the notches as desired. The situation of the handle in any one of these notches corresponds to a definite elevation of the valve above its seat and the desired flow of fluid through the faucet may be gaged with great accuracy and convenience.

I am aware that a faucet cap has been provided with what is called a crown snail or cam embraced by a recessed bulb or handle having similarly shaped parts to be raised and lowered by rotation and such construction I do not claim. In this former device and in the modification which was not self closing to which species my device belongs it was necessary to provide stops upon both the cap and handle which stops together with the recess in the handle and a shoulder on the cap add to the labor and difficulties of manufacture. These parts are rendered unnecessary by my improvement which simplifies the construction and utilizes the walls of the plug itself as stops said walls being suitably arranged at an angle with respect to each other and extended above the inclined wall for this purpose.

Having thus fully described my invention, what I claim is—

In a faucet having a valve seat, the valve and its stem, a spring normally tending to close the valve, the valve stem handle, and a perforated plug having an exterior inclined wall said stem being bent to rest upon and be moved up or down said incline when it is suitably turned, and said plug having its walls 13 and 14 extending above the incline 15 and arranged at an angle to each other to constitute stops for the handle, and said handle being bent and adapted to be screwed into the stem when the plug is separated from the faucet, substantially as set forth.

In testimony whereof I have signed this specification in the presence of two subscribing witnesses.

MARCELLUS E. SPOFFORD.

Witnesses:
H. B. VIALL,
A. L. WRIGHT.